US006674958B2

(12) United States Patent
Wehmeyer et al.

(10) Patent No.: US 6,674,958 B2
(45) Date of Patent: *Jan. 6, 2004

(54) TELEVISION APPARATUS CONTROL SYSTEM

(75) Inventors: Keith Reynolds Wehmeyer, Fishers, IN (US); Robert Howard Miller, Indianapolis, IN (US); Jeffrey Philip Reavis, Indianapolis, IN (US)

(73) Assignee: Thomson Licensing S.A., Boulogne (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/767,088

(22) Filed: Dec. 16, 1996

(65) Prior Publication Data

US 2002/0044763 A1 Apr. 18, 2002

(51) Int. Cl.[7] ................................................. H04N 5/91
(52) U.S. Cl. ............................................. 386/83; 725/58
(58) Field of Search ...................... 386/83, 46; 348/13, 348/731, 734, 906, 460, 563; 455/186.1; 725/58

(56) References Cited

U.S. PATENT DOCUMENTS

| 4,706,121 | A |   | 11/1987 | Young |  |
|---|---|---|---|---|---|
| 4,879,611 | A | * | 11/1989 | Fukui et al. | 386/83 |
| 4,977,455 | A | * | 12/1990 | Young | 386/83 |

(List continued on next page.)

FOREIGN PATENT DOCUMENTS

| EP | 0337336 B1 | 10/1989 | .......... H04N/7/087 |
| EP | 0393555 B1 | 10/1990 | .......... H04N/7/087 |
| EP | 0393556 B1 | 10/1990 | .......... H04N/7/087 |
| EP | 0447968    | 9/1991  |                       |
| EP | 0492298 B1 | 7/1992  | .......... H04N/5/782 |
| EP | 0567168 A2 | 10/1993 | .......... H04N/7/087 |

OTHER PUBLICATIONS

Arthur Heller, "VPS—A New System for Presentation-Controlled Program Recording", *Rundfunktechnische Mitteilungen*, vol. 29 (1985), No. 4, pp. 162–169, (Translation enclosed).

Gerhard Eitz and Karl-Ulrich Oberlies, "Videotext Programs Video Home Sets (VPV)" *Rundfunktech.Mitteilungen*, vol. 30 (1986) No. 5, pp. 223–229. (Translation enclosed).

(List continued on next page.)

*Primary Examiner*—Thai Tran
*Assistant Examiner*—Christopher Onuaku
(74) *Attorney, Agent, or Firm*—Joseph S. Tripoli; Paul P. Kiel

(57) ABSTRACT

A system for controlling apparatus processing a signal representing a television program comprises a source of schedule data comprising at least data representing the time remaining in a television program. Television signal processing apparatus selectively processes the television program representative signal in response to a control signal. A control circuit generates the control signal to condition the processing apparatus to begin processing the television program signal in response to a user control signal, and to stop processing the television program signal when the time remaining in the television program has elapsed, in response to the program schedule data.

14 Claims, 2 Drawing Sheets

U.S. PATENT DOCUMENTS

| | | | | |
|---|---|---|---|---|
| 5,293,357 A | * | 3/1994 | Hallenbeck | 348/734 |
| 5,315,452 A | | 5/1994 | Hong | |
| 5,343,300 A | | 8/1994 | Hennig | |
| 5,353,121 A | * | 10/1994 | Young et al. | 348/563 |
| 5,488,409 A | * | 1/1996 | Yuen et al. | 386/83 |
| 5,541,738 A | * | 7/1996 | Mankovitz | 358/335 |
| 5,619,337 A | * | 4/1997 | Naimpally | 386/83 |
| 5,657,414 A | * | 8/1997 | Lett et al. | 386/35 |
| 5,659,653 A | | 8/1997 | Diehl et al. | |
| 5,856,852 A | * | 1/1999 | Huh | 386/83 |

OTHER PUBLICATIONS

A portion of Nokia Videorecorder VR3819 Operation Manual, 1987–mode (one page).

A portion of ITT catalog 1988 Videorecorder VR3918 VPS (one page).

Copy of the Search Report dated Apr. 28, 1998 listing Refs AA, AB and AI.

* cited by examiner

TELEVISION APPARATUS CONTROL SYSTEM

FIELD OF THE INVENTION

The present invention relates to a system for allowing a user to control a piece of consumer electronics equipment to process a television program currently being received, or the current and subsequent television programs, in some manner with a single step.

BACKGROUND OF THE INVENTION

For one example, current VCRs provide a scheduling mechanism for advance scheduling by the user. Using this mechanism, a user is able to program the VCR to start recording a user specified channel on a specified date from a specified start time to a specified stop time. Further enhancements allow a user to program the VCR to record in this manner every day and/or every week day. However, use of this mechanism is complicated, requiring that the user perform many steps. Attempts have been made to simplify this procedure by assigning programs predetermined code numbers, and allowing a user to program the VCR to record that program by entering that code number. In either case, the user must manually pre-program the VCR using information derived from external sources, such as a published TV schedules.

Current television distribution systems can provide not only the television program information, but also program schedule information. For example, it has been proposed to include schedule information as part of the extended data service (XDS) information placed in the vertical blanking interval (VBI) of a television signal, or in the overscan portion of each horizontal scan line. Also, current satellite television distribution systems include, in addition to television programs, separate data streams containing schedule information, such as, for example, the DSS or Starsight Program Guides. (See brochure "If television is the ultimate escape vehicle", copyrighted 1994 by Starsight Telecast, Inc.) It has been proposed to use such schedule information to schedule a VCR in advance to record a desired program. Using this mechanism, a user peruses the transmitted schedule information and selects programs to be recorded. When a program has been selected, the channel and actual starting and ending times for the desired program are extracted from the transmitted scheduling information, and the VCR automatically programmed to record that program.

Some current VCRs also provide a user a simplified method for recording a channel currently being received. In such VCRs a pushbutton switch is provided on the front panel of the VCR, and/or on the remote control for the VCR, which, if pushed, automatically starts the VCR recording. In some such VCRs, if such a button is pressed once, the VCR will begin recording and will continue to record until the tape in the cassette runs out. If the button is pressed twice, the VCR is automatically set to record for 30 minutes then stop. If the button is pressed three times, the VCR is automatically set to record for 60 minutes, then stop; if pressed four times, 90 minutes; if five, 120 minutes, and so on. This feature has been termed "express record."

The express record feature is useful, but limited. For example, a user is usually more interested in recording the television program currently being received, or the current and the next program or succeeding programs, etc., than recording for a selected amount of time. Further, the user may not know at the time he is initiating the express recording procedure just how much time is remaining in the current program, or the time when a subsequent program will end. If the user sets the VCR to record for less time than remaining in the program or programs, the end of the last program will not be recorded. If the user sets the VCR to record longer, e.g. until the tape is used up, it will most likely record much more than needed. A simplified procedure for recording a program currently being received, or the current and following programs, is desirable.

Such a system would be desirable for scheduling VCRs, and also other signal processing apparatus. For example, turning off television signal display devices or satellite receivers at the end of a program or series of program (as for sleep turn-off functions); locking out a television program or series of programs (as for a child-lockout); or performing similar operations for other such devices.

BRIEF SUMMARY OF THE INVENTION

In accordance with principles of the present invention, a scheduling system for controlling apparatus processing a signal representing a television program comprises a source of schedule data comprising at least data representing the time remaining in a television program. Television signal processing apparatus selectively processes the television program representative signal in response to a control signal. A control circuit generates the control signal to condition the processing apparatus to begin processing the television program signal in response to a user control signal, and to stop processing the television program signal when the time remaining in the television program has elapsed, in response to the program schedule data.

DETAILED DESCRIPTION

Figure 1:
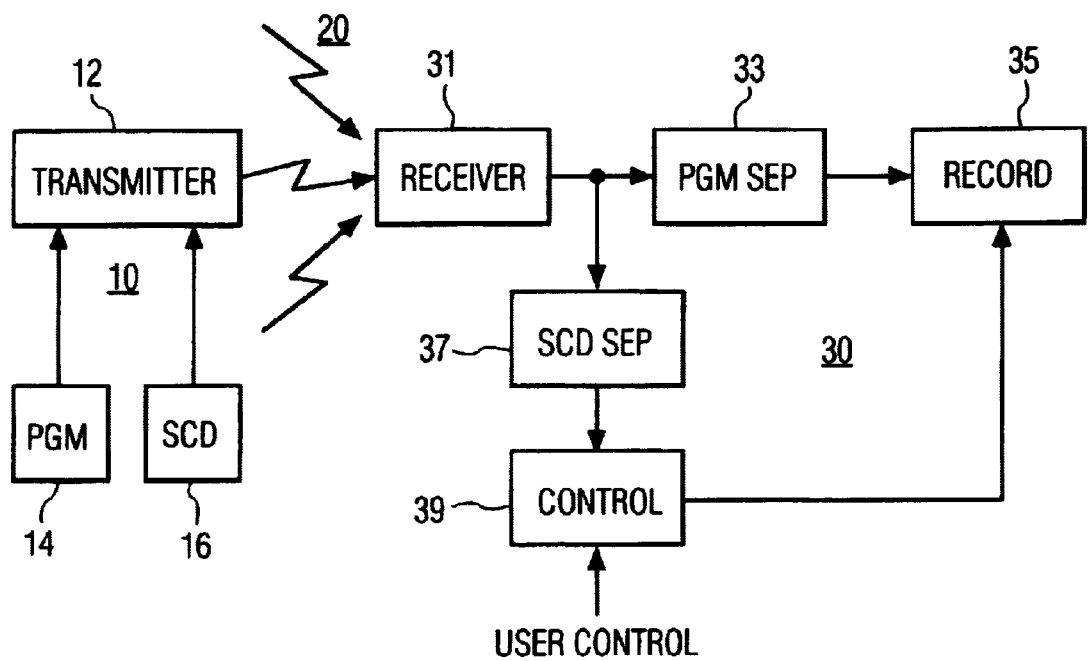
FIG. 1 is a block diagram of a broadcast television program signal distribution system incorporating the present invention.

FIG. 1 is a block diagram of a television program signal distribution system incorporating the present invention. FIG. 1 illustrates only those elements necessary for understanding the present invention. One skilled in the art will understand what other elements are required, how to design and build these elements, and how to interconnect them to the elements illustrated in FIG. 1. The scheduler system illustrated in FIG. 1 is described below as being implemented in, and controlling, a television recorder, such as a VCR. But one skilled in the art will understand that the scheduler system could be configured to control any television signal processing apparatus.

In FIG. 1, a transmitting location 10 includes a source 14 of a television program signal, and a source 16 of schedule data associated with the television program signal, both coupled to the transmitter 12. This schedule data includes at least data representing the time remaining in the television program. It may also include other information such as a description of the program, its starting time, its ending time, its rating, etc. The data representing the time remaining in the program may be in the form of the time remaining in the program, the time-of-day of the end of the program, the starting time and duration of the program, or any other data from which the time remaining in the program may be derived. The transmitter 12 combines the television program schedule data from its source 16, with the television program signal from its source 14 to form a composite television signal. For example, the schedule data may be inserted into the VBI of the television program signal as XDS data, in a manner similar to that used for inserting closed caption data into a television program signal. The transmitter 12 then modulates a radio frequency (RF) carrier with the composite signal, and transmits the signal to a VCR 30 via either a terrestrial on-air, or cable-based RF link 20, all in a known manner.

The VCR 30 receives the modulated RF signal transmitted from the transmitter location 10, and simultaneously receives other transmitted signals, modulated on respective RF carriers having mutually different frequencies, from other transmitter locations (not shown) via the RF link 20. A receiver 31 selects one of the transmitted signals to receive, demodulates the received signal, and couples the demodulated composite television signal to a television program signal separator 33 and a schedule data signal separator 37. The television program signal separator 33 extracts the television program signal from the composite signal and supplies that signal to the record apparatus 35, all in a known manner. The schedule data signal separator 37 extracts the schedule data, e.g. from the VBI of the received signal, and couples it to a control circuit 39 in a manner similar to that used for extracting closed caption data from a television program signal. (See, for example, U.S. Pat. No. 5,371,545, issued Dec. 6, 1994 to Tults, and U.S. Pat. No. 5,428,400, issued Jun. 27, 1995 to Landis et al., both of which are incorporated by reference.) A user control signal is also coupled to the control circuit 39. The control circuit 39 produces a control signal which is coupled to the record apparatus 35. The record apparatus 35 selectively records the television signal from the television program separator 33 in response to the control signal from the control circuit 39.

The control signal produced by the control circuit 39 may be a hardwired signal, in the case where the control circuit 39 is implemented in the same enclosure as the record apparatus 35, as would be the case in the exemplary VCR 30. However, it is also possible for the control circuit 39 to be implemented in a different enclosure, such as a satellite receiver enclosure, or a standalone enclosure, while the record apparatus 35 is a standard VCR which is controllable using an IR link in a known manner. In this configuration, the control signal is an IR signal which mimics the signals generated by a remote control for the VCR. Such a control signal can control the operation of the VCR in the same manner as a user using the remote control unit.

In operation, in response to the user control signal, the control circuit 39 generates a control signal for the record apparatus 35 which conditions the record apparatus 35 to begin recording the television program signal being supplied to it by the television program signal separator 33, in the manner similar to that used for implementing express recording, described above. The control signal may also include a channel to be recorded. Simultaneously, the television schedule data associated with the television program signal currently being received, produced by the television schedule data separator 37, is processed to determine the time remaining in the program being recorded. The control circuit 39 monitors the time, and when the time remaining in the television program being recorded has elapsed, the control circuit generates the control signal for the record apparatus 35, which conditions the record apparatus 35 to stop recording.

Figure 2:
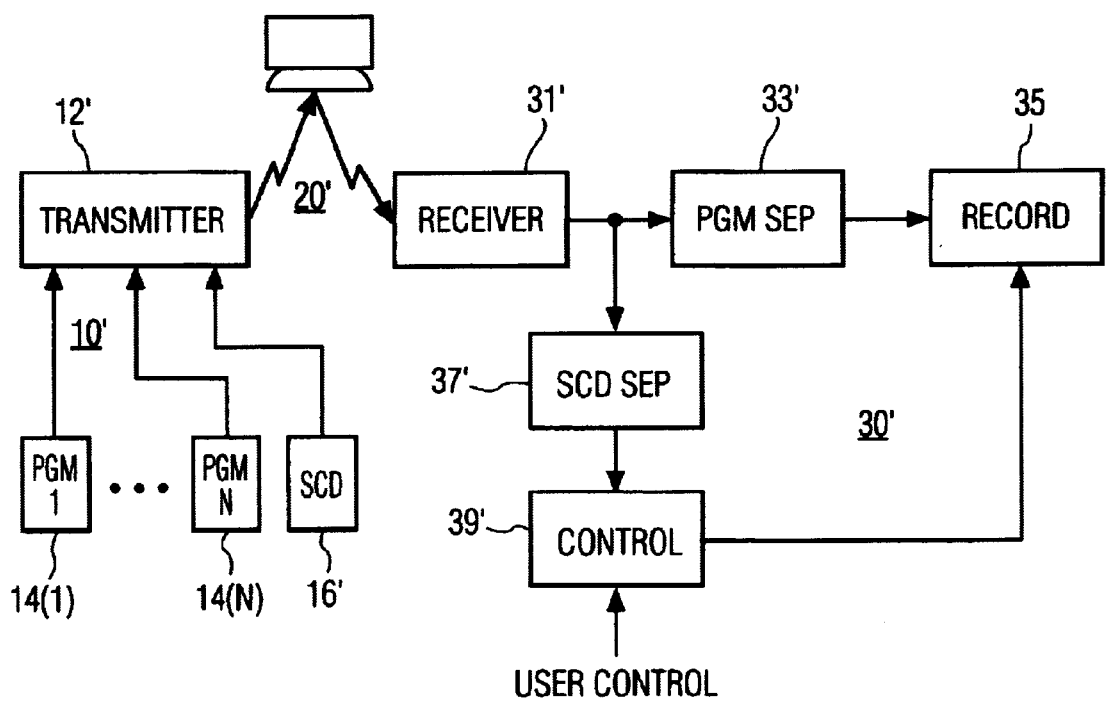
FIG. 2 is a block diagram of a satellite television program signal distribution system incorporating the present invention.

FIG. 2 is a block diagram of a satellite television program signal distribution system incorporating the present invention. Elements which are similar to those illustrated in FIG. 1 are designated with the same reference number and are not described in detail below. In FIG. 2, a transmitter location 10' includes a plurality of N sources of television program signals, PGM 1 through PGM N, 14(1) through 14(N), respectively, all coupled to the transmitter 12'. These television program sources 14(1) through 14(N) produce digital packet streams representing their television program signals, in a known manner. In addition, a source of schedule data 16' produces a packet stream containing schedule information for all of the television programs 14(1) through 14(N). This information includes the identification of a packet stream, and at least data representing the time remaining in the television program being carried by that packet stream. Other information concerning the television programs may also be carried by the schedule information packet stream, including starting times, ending times, descriptions of the television programs, ratings, etc. of the television programs being carried by the transmitted signal. The transmitter 121 combines the respective packet streams from the television program sources 14(1) through 14(N) and the schedule data source 16' into a single packet stream in a known manner. This packet stream is then modulated onto an RF carrier and transmitted to a receiver location 30' via an RF satellite link 20', also in a known manner.

A receiver 31' in the receiver location 30' receives the modulated RF signal from the RF satellite link 20', demodulates the signal and produces the transmitted packet stream in a known manner. The television program signal separator 33' extracts packets containing data from a selected one of the television program sources 14(1) through 14(N) from the received packet stream. These packets are processed in a known manner by the television program signal separator 33' to produce a standard analog television signal. This standard analog signal is supplied to the record apparatus 35, which selectively records this signal in response to a control signal. Alternatively, the record apparatus 35 may be a digital data record apparatus. In this case, the digital packets themselves are supplied to, and selectively recorded by, the record apparatus 35.

In a similar manner to that described above, the control circuit 39 responds to a user control signal by supplying a control signal (e.g. hardwired or IR, as described above) to the record apparatus 35 conditioning it to begin to record the television program signal currently being produced by the television program separator 33'. Simultaneously, the schedule data separator 37' extracts and processes the packets produced by the receiver 31' containing the television program schedule data. The television program schedule data is supplied to the control circuit 39' which determines the time remaining in the television program being recorded. The control circuit 39' monitors this time, and when the time remaining in the television program being recorded has elapsed, the control circuit 39' supplies a control signal to the record apparatus 35, conditioning it to stop recording.

Figure 3:
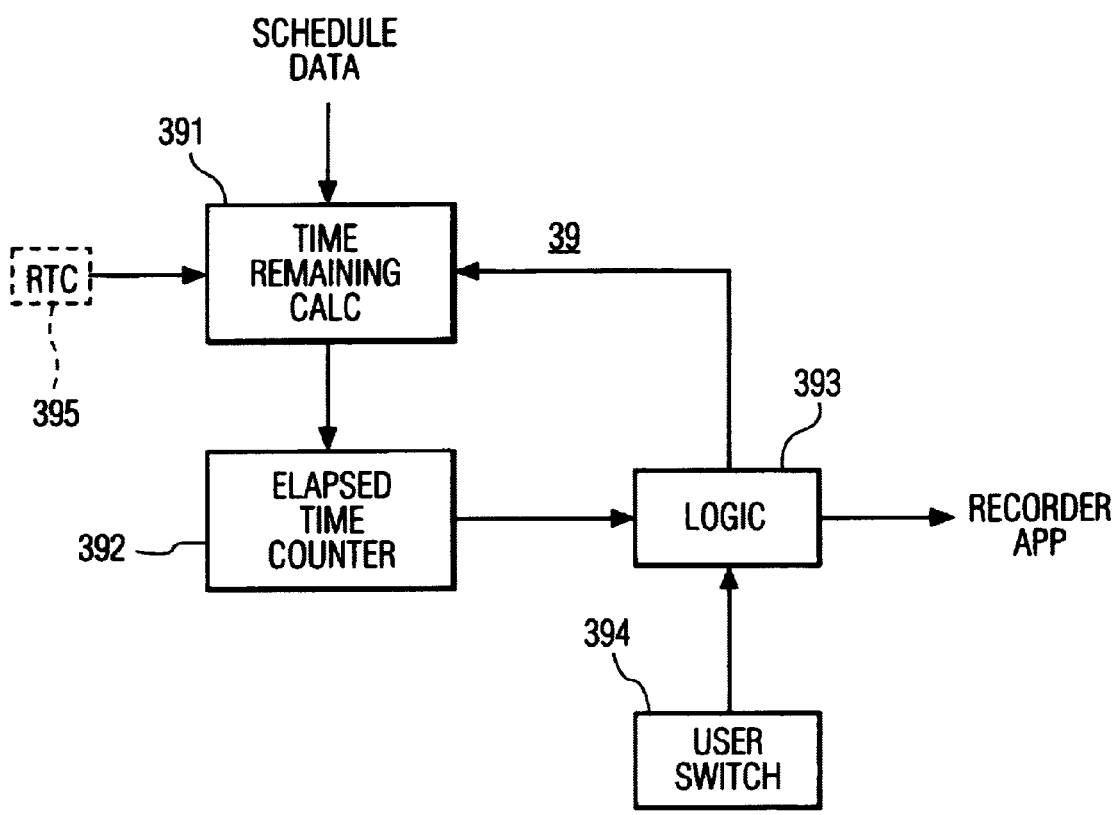
FIG. 3 is a more detailed block diagram illustrating the control circuit illustrated in FIGS. 1 and 2.

FIG. 3 is a more detailed block diagram illustrating the control circuit illustrated in FIGS. 1 and 2. In FIG. 3, the television program schedule data from the television program schedule separator (37 or 37') is coupled to a first input terminal of a calculator 391 for determining the time remaining in the program currently being recorded. A real time clock (RTC) 395 is shown in phantom coupled to a second input terminal of the time remaining calculator 391. The time remaining calculator 391 produces a signal representing the time remaining in the television program at an output terminal, which is coupled to an input terminal of an elapsed time counter 392. The elapsed time counter 392 produces a signal indicating that the elapsed time in the elapsed time counter 392 has elapsed at an output terminal, which is coupled to an input terminal of a logic element 393. A first output terminal of the logic element 393 produces a signal which is coupled (e.g. via hardwire or IR link) to the control input terminal of the record apparatus 35, and a second output terminal is coupled to the time remaining calculator 391. A user controlled switch 394, generates the user control signal, and may be a single pushbutton switch on the front panel of the VCR 30 and/or a remote control for the VCR 30 (of FIGS. 1 and/or 2), in a known manner. The user controlled switch 394 is coupled to a second input terminal of the logic element 393. The control circuit 39 illustrated in FIG. 3 may be fabricated of separate elements, as illustrated, or may be fabricated within a microprocessor programmed to provide the functions illustrated in FIG. 3, or a combination of these two techniques.

In operation, a user generates the user input signal by pressing the pushbutton switch 394. The logic element 393, in response to the user input signal, immediately generates a control signal for the record apparatus 35 which conditions the record apparatus to begin recording the television program currently being produced by the television program separator (33 or 33'). The logic element 393 also generates a logic signal for the time remaining calculator 391 causing it to commence operation as described below.

The time remaining calculator 391 processes the television program schedule data from the television program schedule data separator 37 to determine the time remaining in the program currently being recorded. For the system illustrated in FIG. 1, the television program schedule data could be delivered in the XDS data from the VBI, or in data inserted in the overscan portion of horizontal lines, and produced by the schedule data separator 37. For the system illustrated in FIG. 2, the television program schedule data could be delivered in a packet stream produced by the schedule data separator 37'. This packet stream is processed by the time remaining calculator 391 to extract the packets containing the schedule data for the program currently being recorded. In either case, that data is processed to calculate the time remaining in the program being recorded in the following manner.

If the remaining time is expressed in terms of the time remaining in the program being recorded, then this value is used directly in the manner described below. If the time remaining is expressed in terms of the time-of-day, then the real time clock (RTC) 395 is accessed. The RTC 395 maintains the current time-of-day, and is settable by the user in a known manner. The difference between the current time from the RTC 38 and the ending time of the program being recorded is calculated in a known manner and is the time remaining in the program. If the ending time is expressed in terms of a starting time, and program duration, the sum of the program starting time and the program duration time is calculated, giving the ending time, in a known manner. Then the time remaining is calculated as described above.

The time remaining in the television program, calculated in the time remaining calculator 391 as described above, is supplied to the elapsed time counter 392. The elapsed time counter then begins to count the time supplied to it from the time remaining calculator 391, in a known manner. When the time remaining in the television program has elapsed, the elapsed time counter sends a signal to the logic element 393. In response to that signal, the logic element generates the control signal for the record apparatus 35 conditioning it to stop recording.

Such a VCR permits a user to record the remaining portion of a television program currently being received, in its entirety, but without recording more, by a single press of a single pushbutton switch, regardless of when that button is pressed during the television program.

In accordance with the present invention, a first press of the pushbutton switch conditions the VCR to begin recording until tape runs out, and a second press conditions the VCR to record the television program currently being received. In this embodiment, the logic element 393 in the control circuit 39 responds to a first press of the pushbutton switch 394 by a user by sending a control signal to the record apparatus 35, conditioning it to begin recording, and continue to record until the tape runs out. The logic element 393 then responds to a second press of the pushbutton switch by the user by sending a signal to the time remaining calculator 391, conditioning it to extract the time remaining in the television program currently being recorded. This time is supplied to the elapsed time counter 392, which sends a signal to the logic element 393 when that time has elapsed. The logic element 393 then sends a control signal to the record apparatus 35 to condition it to stop recording when that program is over, all as described above.

In an enhancement to this embodiment, the logic element 393 in the control circuit 39 responds to subsequent presses of the pushbutton switch 394 in the following manner. The first press of the pushbutton switch 394 causes VCR to begin recording and record until the tape runs out. A second press of the pushbutton switch 394 causes the VCR to begin recording and continue until the television program currently being recorded is over, both as described above. A third press of the pushbutton switch 394 causes the VCR to record the current television program and the next following television program. A fourth press of the pushbutton switch 394 causes the VCR to record the current television program, and the next two following television programs, and so forth.

In an embodiment of this enhancement for FIG. 1, the time remaining calculator 391 maintains a register (not shown) containing the count of the number of television programs yet to be recorded. With each press of the pushbutton switch, the number in that register is incremented, in a known manner. When a current television program is over, that count is decremented. When the number indicates that the final program is being recorded, the schedule data information is extracted, and the time remaining in that program is calculated, in the manner described above. This time is supplied to the elapsed time counter 392 which supplies a signal to the logic element 393, which in turn sends a control signal to the record apparatus 35 conditioning it to stop recording.

In an embodiment of this enhancement for FIG. 2, the time remaining calculator 391 stores the identification of the last program to be recorded. The schedule data from the television program schedule data separator 37 is scanned to extract the data representing the ending time of this television program. The time remaining calculator 391 calculates the time remaining until the end of this television program and stores it in the elapsed time counter 392. At each press of the pushbutton switch 394, the schedule data from the television program schedule data separator 37 is scanned again to extract the data representing the duration of the next sequential program. The identification of that program is stored, and its duration is added to the time in the elapsed time counter 392. The elapsed time counter 392 then always contains the recording time remaining. When the recording time remaining has elapsed, the elapsed time counter 392 sends a signal to the logic element 393, which, in turn, sends a control signal to the recording apparatus 35 conditioning it to stop recording.

In a further alternate embodiment, the schedule information separator 37 includes circuitry to determine whether schedule data is available in the received television signal, and if it is not, then the control circuit 39 reverts to operate in the manner of the prior art express record feature. That is, in response to a first press of the pushbutton switch the control circuit 39 conditions the record apparatus 35 to begin recording the television program currently being received, and continue recording until the tape runs out. In response to a second press of the pushbutton switch, the control circuit sets the elapsed time counter 392 to 30 minutes, and conditions the record apparatus 35 to stop recording at the end of the 30 minute period. In response to a third press of the pushbutton switch, the record apparatus 35 is conditioned to record for 60 minutes, and so forth.

Though described in terms of a television signal recorder, i.e. a VCR, one skilled in the art will understand that the present invention may be adapted to control any television signal processing apparatus. For example, a sleep timer may be similarly controlled to turn off a television display device at the conclusion of the television program currently being received, or at the end of a series of programs, by the operation of apparatus according to the present invention. For another example, a television program lock-out function may also be similarly controlled to prevent viewing of the currently received television program, or series of programs (e.g. to prevent viewing by children) by operation of apparatus according to the present invention.

Also, as described above, the scheduling system need not be located in the same enclosure as the apparatus being controlled. Instead, it may be located in other apparatus, or in its own enclosure, and control the television signal processing apparatus via IR (or other) remote control signals. Furthermore, while the present invention has been illustrated in embodiments for two different television signal distribution systems: terrestrial broadcast, and satellite broadcast, one skilled in the art will understand that the method of distribution of the television program representative signals and their associated schedule data is not germane to the present invention, and that any distribution system which delivers schedule representative data to the scheduler may be used by the present invention.

What is claimed is:

1. Apparatus for processing a program signal representing a sequence of first and second video programs, the apparatus comprising:
   means for determining whether the program signal includes program schedule information indicating durations of the first and second video programs;
   a signal processor for processing the program signal;
   means for user activation of the signal processor; and
   control means being responsive to a determination that the program signal includes program schedule information for controlling the signal processor to process the program signal for the duration of the first video program in response to a first operation of the user activation means that generates a predetermined user input signal, and to process the program signal for the duration of the first and second video programs in response to consecutive first and second operations of the user activation means, which generate consecutive first and second transmissions of the predetermined user input signal, while the first video program is being received, the control means being further responsive to a determination that the program signal lacks program schedule information for controlling the signal processor to process the program signal for a first predetermined period of time in response to the first operation of the user activation means that generates the predetermined user input signal, and to process the program signal for a second predetermined period of time in response to the second operation of the user activation means that generates the predetermined user input signal for the second time subsequent to the first operation of the user activation means.

2. The apparatus according to claim 1, wherein the signal processor includes means for processing an analog television signal and program schedule information included in the vertical blanking interval of the analog television signal.

3. The apparatus according to claim 1, wherein the signal processor includes means for processing an analog television signal and program schedule information included in the horizontal overscan portion of the analog television signal the signal processor includes means for processing the analog television signal.

4. The apparatus according to claim 1, wherein the signal processor includes means for processing a digital television signal wherein the first video program, the second video program, and the program schedule information are associated with respective packet streams, each packet stream having a unique identifier.

5. The apparatus according to claim 1, wherein the control means includes means for causing the program signal to be recorded onto a storage medium.

6. The apparatus according to claim 1, wherein the control means comprises for implementing a sleep-timer function.

7. The apparatus according to claim 1, wherein the control means comprises means for implementing a program lock-out function.

8. A method for controlling processing of a program signal representing a sequence of first and second video programs, the method comprising the steps of:
   determining whether the program signal includes program schedule information indicating durations of the first and second video programs;
   in response to a determination that the program signal includes program schedule information indicating durations of the first and second video programs, controlling a signal processor to process the program signal for the duration of the first program signal in response to a receipt of a predetermined user input signal, and controlling the signal processor to process the program signal for the duration of the first and second video program signals in response to consecutive first and second receipts of the predetermined user input signal while the first video program is being received; and
   in response to the determination that the program signal lacks program schedule information indicating the duration of the first and second video programs, controlling the signal processor to process the program signal for first and second consecutive predetermined periods of time in response to consecutive and first and second receipts of the predetermined user input signal while the first video program is being received.

9. The method according to claim 8, wherein the processing of the program signal comprises processing an analog television signal and program schedule information included in the vertical blanking interval of the analog television signal.

10. The method according to claim 8, wherein the processing of the program signal comprises processing an analog television signal and program schedule information included in the horizontal overscan portion of the analog television signal.

11. The method according to claim 8, wherein the processing of the program signal comprises processing a digital television signal having the first video program, the second video program, and the program schedule information being associated with respective packet streams, each packet stream having a unique identifier.

12. The method according to claim 8, wherein the processing of the program signals comprises recording the program signals onto a storage medium.

13. The method according to claim 8, wherein the processing of the program signal comprises implementing a sleep-timer function.

14. The method according to claim 8, wherein the processing of the program signal comprises implementing a program lock-out function.

* * * * *